United States Patent [19]

Yamauchi et al.

[11] 3,988,288

[45] Oct. 26, 1976

[54] POWDER PAINT

[75] Inventors: Kazuhiko Yamauchi, Amagasaki; Minoru Murakami, Toyonaka; Hisashi Nakano, Takaishi, all of Japan

[73] Assignee: Kawakami Paint Mfg. Co. Ltd., Japan

[22] Filed: Aug. 21, 1974

[21] Appl. No.: 499,159

Related U.S. Application Data

[63] Continuation-in-part of Ser. No. 282,833, Aug. 11, 1972, abandoned.

[30] Foreign Application Priority Data

Aug. 24, 1971 Japan.............................. 46-64565

[52] U.S. Cl.................... 260/37 EP; 260/830 P; 260/835; 427/180; 427/185
[51] Int. Cl.$^2$.................. C08G 51/04; C08G 45/14
[58] Field of Search............ 260/835, 830 P, 37 EP; 117/21

[56] References Cited

UNITED STATES PATENTS

| 3,063,870 | 11/1962 | Wakeman | 117/161 K |
| 3,383,434 | 5/1968 | Carlston | 260/835 |
| 3,629,226 | 12/1971 | Lohse | 260/835 |
| 3,629,362 | 12/1971 | Carlston | 260/835 |
| 3,684,771 | 8/1972 | Braun | 260/835 |
| 3,686,360 | 8/1972 | Cunningham | 260/850 |
| 3,699,082 | 10/1972 | Koerner | 260/75 NK |
| 3,759,854 | 9/1973 | Chang | 260/21 |

FOREIGN PATENTS OR APPLICATIONS

| 694,282 | 9/1964 | Canada | 260/835 |

Primary Examiner—Theodore E. Pertilla

[57] ABSTRACT

The powder paint of the present invention comprises an amino polyester resin and an epoxy compound as essential components and can preferably contain other resins or other compounds, pigments, additives, etc. Said powder paint, when applied to substrate by powder coating methods, provides a tough thermosetting film by means of crosslinking of amino groups of the amino-group-containing polyester resin with epoxy groups of the epoxy compound by baking. The obtained film has excellent weather resistance, corrosion resistance, mechanical properties and chemical resistance.

24 Claims, No Drawings

3,988,288

POWDER PAINT

CROSS REFERENCE TO RELATED APPLICATION

This application is a continuation-in-part application of our application Ser. No. 282,833 filed on Aug. 11, 1972, now abandoned.

FIELD OF THE INVENTION

Powder paints are those which are used in such a manner that a film-forming component is applied in the form of powder to an object without using volatile dispersing medium such as any organic solvent or water and then the component is melted by baking to obtain a film.

Thermosetting powder paint is prepared generally by mixing a resin for powder paint together with a hardner, pigments, additives, etc. to obtain a powdery mixture, blending the mixture under heating to 80° – 130° C to melt in a blender such as an extruder or a hot roll mill and then grinding the mixture to obtain the aimed powder paint. In another process, the components are mixed and thereby dispersed by using a dispersing machine or mixer such as a ball-mill or a ribbon blender at ambient temperature to obtain the powder paint.

Principal, general characters of powder paints are as follows:

1. Although conventional solvent type paints have been unavoidable to cause solvent pollution, powder paints are free from the problem since they are solvent-free.

2. Resins which could not been used for coating according to conventional processes due to insolubility in a solvent according to their high molecular weights can be used for powder paints. Consequently, powder paints can have superior physical and chemical properties compared with conventional paints.

3. As compared with conventional paints, a thicker coating film can be obtained by applying the paint only once. (The film thickness varies in the range of 40 – 1,000 microns depending upon types of coatings). The coating operation is easy and it can be automated readily. Thus, labor of coating operation can be reduced easily.

Powder paints are applied in various coating methods depending upon their types and varieties of substrates. Coating methods of them are classified practically into the following four methods:
1. Flame spraying
2. Fluidized bed coating
3. Electrostatic spraying
4. Electrostatic fluidized bed coating Among the above four methods, electrostatic methods (3) and (4) will become popular more and more.

Powder paints can be used widely for general stoving applications. For example, they are used for building materials, motorcar parts, pipes, machine parts, electric appliances, steel furnitures, etc.

DESCRIPTION OF THE PRIOR ART

Recently, the powder paints having the above described characters have been developed rapidly. At present, thermosetting type paints containing epoxy resin and thermoplastic type paints containing vinyl chloride resin are used practically on a relatively large scale. However, epoxy powder paints are unsuitable for exterior coatings due to their poor weather resistance, though they have excellent mechanical properties, chemical resistance, corrosion resistance and workability. Thus, their use is limited largely. Vinyl chloride paints require a primer and, they cannot form a thin film. Accordingly, cost of them is high and besides some difficulties are observed in coating control. Other powder paints containing as base a thermoplastic resin such as nylon resin or polyester resin are used but they are still insufficient with respect to cost or unbalance of properties and therefore they are of insufficient practical value.

Development of a powder paint having well-balanced properties and free from said demerits has been expected and many investigations relating to thermosetting powder paints have been made. There have been proposed, for example, the following processes:

1. Japanese Patent Public Disclosure No. 442/1971:
"Process for preparing cross-linking powder paints" filed by Farbenfabriken Bayer A. G. (Germany). This relates to a process for preparing a cross-linking resin in the absence of solvent by reacting a hydroxyl group containing resin with a alkoxymethylisocyanate, in which reaction is carried out in temperature-controlled screw extruder in melting state.

2. Japanese Patent Public Disclosure No. 1036/1971:
"Process for preparing self-cross-linkable binder substances of high reactivity for powder paint" filed by Farbenfabriken Bayer A. G. (Germany). This relates to a process for preparing self-cross-linkable binder substances of high reactivity for powder paint, particularly free hydroxyl group-containing polyacrylate binder substances modified with an alkoxymethyl isocyanate for powder paint.

3. Japanese Patent Publication No. 10220/1972:
"Thermosetting powdery binders for moldings, particularly for powder coatings" filed by Chemische Werke Albert (Germany). This relates to thermosetting powder cementing materials comprising mixture of a resin containing free hydroxyl group and a resin containing free carboxyl group.

4. Japanese Patent Publication No. 19717/1972:
"Process for preparing thermosetting primary condensates having storage stability" filed by Ciba-Geigy A. G. (Switzerland). This relates to a process for preparing thermosetting primary condensates containing as base polyepoxide compounds, acidic polyesters and polycarboxylic anhydrides suitable for the prepararation of coatings, adhesives, binders, etc.

By intensive investigation to obtain an aimed powder paint, the inventors have found a new powder paint which is different from that of publications and disclosures mentioned above.

SUMMARY OF THE INVENTION

Accordingly, the object of the present invention is to provide a thermosetting polyester type powder paint suitable for anticorrosive exterior use as well as interior use.

DESCRIPTION OF THE PREFERRED EMBODIMENTS

The powder paint of the present invention comprises a amino polyester resin and a epoxy compound as essential components, and further can preferably contain therein other resins or other compounds, pigments, additives, etc. Said powder paint, when applied by powder coating methods on a substrate, provides a tough thermosetting film thereon by cross-linking amino group of the amino polyester resin with epoxy group of the epoxy compound by baking. The film obtained has excellent weather resistance, corrosion resistance, mechanical properties and chemical resistance.

The present powder paint comprises an amino-polyester resin and an epoxy compound respectively as main ingredients and cross-linking agent. In the present invention is used an amino-group-containing polyester resin obtained by combining a polyester resin with 0.2 – 15 wt.% of an amino compound, to has a softening point (measured by ring and ball test) of from 50° C to 200° C, preferably from 80° C to 130° C, since it can be used in the form of powder. The polyester resin used as a raw material of the amino polyester resin is a reaction product of acid components and alcohol components, in which more than 50 mol % of said acid components are terephthalic acid, isophtalic acid or their lower alkyl esters and said alcohol components are selected from dihydric alcohols, trihydric alcohols and tetrahydric alcohols. Said amino compound is selected from polyvalent amines, urea, dicyandiamide, melamine, etc.

The powder paint can be prepared by mixing said amino polyester resin, with epoxy compound, and preferably with other resins or other compounds, coloring pigments, extender pigments, additives, etc., and blending the mixture in conventional methods.

The powder paint obtained is powder and substantially solvent-free and may be applied by electrostatic spraying, electrostatic fluidized bed coating or fluidized bed coating. As the film thus obtained has excellent properties, the present powder paint may be used widely for both interior and exterior purposes. Therefor the present powder paint is suitably used for exterior anticorrosive coatings such as fences, road marks, building materials, prefabricated structures, transformers, exterior meter boxes, motor car parts and so on.

As molecular weight becomes increased, mechanical properties of a polyester resin become better. Therefore the polyester resin used should be made from terephthalic acid, isophthalic acid or their lower alkyl esters to give a higher molecular weight. Then acid component of the polyester resin used in the present invention should contain more than 50 mol % of terephthalic acid, isophthalic acid or their lower alkyl esters. A polyester resin using phthalic anhydride as its main acid component can be pulverized easily, but coating film obtained therefrom has only poor mechanical properties, because it has usually a lower molecular weight and is apt to take a cyclic polymer structure. When maleic anhydride, adipic acid or a fatty acid is used in a large amount in a polyester resin, it is difficult to obtain a resin having a high softening point.

Although mechanism by which a polyester resin can combine with an amino compound is not clear, it is considered that amino groups may be introduced in the polyester backbone by aminolysis in the form of amides or aminesalts of carboxyl group.

The term "amino polyester resin" as used herein, refers to polymers that are made by reacting the specified polyester resins with amino compounds.

The amount of amino compound added to a polyester resin varies depending to active hydrogen equivalent of the amino compound. The suitable amount used is in a range of 0.2 – 15 wt.%. With an amount becomes less than 0.2%, its effect above cannot be obtained. With an amount more than 15%, intrinsic properties of the polyester resin are changed unfavorably.

Properties of the powder paints obtained depend widely on a selection of both an amino polyester resin and an epoxy compound and also on the proportion of them. The proportion has to be changed on the basis of the properties of resins used and should be determined by experiment. Generally speaking, about 99 – 50 wt.% of the amino-polyester resin and about 1 – 50 wt.% of the epoxy compound are preferably used. When the epoxy compound less than about 1 wt.% is used, the powder paint cannot be cross-linked well by baking and when more than about 50 wt.% of epoxy resin is used the weather resistance of the powder paint is generally inferior. Although type of a epoxy compound to be selected is not limited from any point, property of the epoxy compound to be selected should be taken in good consideration.

As alcohol components used for the polyester resins, there can be employed dihydric alcohols such as ethylene glycol, propylene glycol, butylene glycol, neopentyl glycol, diethylene glycol, dipropylene glycol, pentanediol, hexanediol, heptanediol and 4,4-isopropylidene dicyclohexanol (hydrogenated bisphenol A); and trihydric or other polyhydric alcohols such as glycerol, trimethylolethane, trimethylolpropane, pentaerythritol and tris-2-hydroxyethyl isocyanurate (THEIC). In addition, epoxy group-containing compounds such as Cardura E (a glycidyl ester of a synthetic fatty acid, Versatic acid; a product of Shell Chemical Corp.) may be also used similarly as an alcohol component.

As acid components used together with said terephthalic acid, isophthalic acid or a lower alkyl ester thereof, there can be employed acid anhydrides such as phthalic anhydride or lower alkyl esters thereof, maleic anhydride, trimellitic anhydride, pyromellitic anhydride, tetrahydrophthalic anhydride, hexahydrophthalic anhydride, Hymic anhydride and methyl Hymic anhydride; aliphatic dicarboxylic acids such as succinic acid, fumaric acid, itaconic acid, adipic acid, azelaic acid and sebacic acid; Diels-Alder adducts such as adduct of maleic anhydride and terpenes or cyclopentadiene; fatty acids such as coconut oil fatty acid, soybean oil fatty acid, safflower oil fatty acid and drying oil fatty acid and dimers of those acids; benzoic acid, p-tert.-butyl-benzoic acid, dimethylolpropionic acid, tris-2-carboxyethyl isocyanurate, abietic acid and hydrogenated rosin.

Said polyester resins are easily obtained by mixing said acid components and said alcohol components and then condensing the two components by using one of the two publically known preparing methods, namely either melting method (no solvent method) or solvent method (solution method).

The proportion of an acid component and an alcohol component is calculated on the basis of relation of equivalents. Generally, 0.8 – 1.2 equivalents of alcohol to one mol of acid are used suitably.

The two components of acid and alcohol are charged at one at a time or stepwisely. The charge is subjected to the esterification reaction under stirring in an inert gas stream in the presence of a small amount (2 – 5 wt.% based on the charged materials) of a solvent in the case of solvent method or in the absence of solvent in the case of melting method at a temperature of 150° – 250° C until the softening point of the resin is 80° to 130° C.

In melting method the resulting water or vapourizable resultant is exhausted as vapour. In solvent method aromatic hydrocarbon solvent such as xylol is charged and refluxed by cooling the vapourized vapour, separating the condensed water and returning the condensed organic distillate to the reactor. Inert gas or solvent vapour prevents coloration of resin or oxidation of unsaturated hydrocarbon. In solvent method, more uniform resin can be obtained, since the solvent washes down continuously the resin and other raw materials from the reactor wall and effective stirring is ensured. It is preferable to apply the solvent method to the present invention, since accelerating reaction rate and making the removal of water easy. In many cases, the solvent remains in the resulting polyester resin. If necessary, the solvent can be removed upon completion of reaction by elevating the temperature, by introducing a powerful stream of an inert gas therein or by distilling out the solvent under reduced pressure.

When a lower alkyl ester of terephthalic acid or isophthalic acid is used as acid component, these esters and the alcohol are added together with an organic acid metal salt catalyst such as lithium naphthenate, lead naphthenate or a metal oxide catalyst such as litharge. The mixture is heated under stirring in the atmosphere of an inert gas stream at a temperature of 200° – 280° C to carry out transesterification to distill out produced methanol. In this case, if necessary, phthalic anhydride or other acids can be used to add in the reaction medium after transesterification, and then carry out esterification.

Fatty oils, i.e. glycerol esters of said fatty acids can be also used. In these cases, likewise the usual method for preparing alkyd resin, said alcohol and said catalyst are added to the fatty oil, and the mixture is heated in a temperature of 200° – 280° C to accomplish transesterification, then acid components and remaining alcohol components are added to the reaction mixture and a uniform resin is obtained after esterification.

In another method, the polyester resin can be obtained more easily by decomposing high molecular weight crystalline polyethylene terephthalate or polyethylene isophthalate used as fibers films, or resins in the presence of said alcohol and said catalyst.

Polyethylene terephthalates used in said reaction are obtained by condensation of terephthalic acid or a lower alkyl ester of terephthalic acid with ethylene glycol under heating in the presence of a said catalyst. They are used widely in the form of fibers or films. Polyethylene isophthalates are obtained in the same manner as above and they are commercially available as a resin under name of Viron 200 (a trade name of Toyobo Co.; polyethylene isophthalate resin). The polyester resins are prepared easily from those high molecular polymers by adding 10 – 20 parts of said alcohol (preferably that having boiling points above 200° C) to 50 – 80 parts of a polyethylene terephthalate or polyethylene isophthalate, in the presence of said catalyst, subjecting the mixture to transesterification under heating at about 230° C to about 280° C, and then, if necessary condensing the product with one or more of said acid components under heating.

Polyester resins obtained as above have molecular weights of about 1,000 – 10,000, polymerization degrees of about 4 – 50 and softening points of about 80° – 130° C.

Amino groups can be introduced into thus obtained polyester resins by adding an amino compound to polyester resin in the presence or absence of solvent and heating the mixture to 130° – 250° C for 10 – 60 minutes. In case a solvent is used, the solvent can be removed in the same manner as mentioned above about removing the refluxing solvent, if necessary.

The amino group-containing polyester resins obtained as above are solid. Softening points of them must be 50° – 200° C, preferably 80° – 130° C, since they are used in the form of powder after pulverizing. Resins having softening points below 50° C cannot be used, since blocking is caused during the grinding procedure or after converting to the paint. If a resin having a softening point above 200° C is used as a powder coating, the coated film is not melted sufficiently at a baking temperature around 200° C and smooth, uniform, excellent film cannot be obtained.

As the amino compounds, there can be employed polyvalent amines such as ethylenediamine, diethylenetriamine, triethylenetetramine, tetraethylenepentamine, phenylenediamine, xylylenediamine, diaminodiphenylmethane, diaminodiphenylsulfone, urea, dicyandiamide, melamine, benzoguanamine and acetoguanamine.

As epoxy compounds, there may be used, in addition to usual bisphenol type epoxy resins, any polyepoxide compounds containing two or more epoxy groups in its molecule such as are sold under the trademarks EPON 1031, an epoxy resin of Shell Chemical Co. which is the condensate of 1,1,2,2-tetrakis-(4-hydroxyphenyl)ethane and epichlorohydrin, EPICLON, an epoxy resin of Dai-Nihon Ink Kogyo Co. which is the condensate of 2,2-bis-(4-hydroxyphenyl)-propane and $\beta$-methylepichlorohydrin, ADEKA EP4085 which is an epoxy resin of hydrogenated bisphenol (specifically the condensate of 2,2-bis-(4-hydroxycyclohexyl)-propane and epichlorohydrin), and SHODYNE S-607X and S-609X, which are diglycidyl esters of Showa Denko Co. obtained from phthalic anhydride and epichlorohydrin, triglycidyl isocyanate, vinylcyclohexene dioxide, cyclopentadiene dioxide, epoxy compounds obtained by oxidation of unsaturated compounds such as epoxidated soybean oil, epoxy group-containing acrylic resins, epoxy group-containing polybutadiene and epoxidated polyolefins.

As a matter of course, the powder paint of the present invention may contain other components such as other resins, other compounds, coloring pigments, extender pigments, additives, etc. in combination with said amino polyester resin and epoxy compound, as in general most of powder paint for practical use which contain many other components in addition to base resin used. They can be used when necessary.

As one of said other compounds above, a blocked-polyisocyanate compound may be used as a subsiduary cross-linking agent. Unblocked polyisocyanate compounds cannot be used since they have generally poor storage stability. When a blocked-polyisocyanate is used, amino groups of the amino polyester resin react with both isocyanate groups of the blocked-polyisocyanate and the epoxy groups of the added epoxy compound by baking.

The blocked-polyisocyanate do not react with active hydrogen compounds at ambient temperature even if they are mixed together. The blocked-polyisocyanate can be stored stably and when they are heated to 160° – 230°C, polyisocyanate is regenerated from the blocked body in general, though the temperature differs depending upon chemical properties of the blocked body. Usual blocked-polyisocyanates comprising an adduct of polyisocyanate compound and isocyanate blocking agent are used. There are polyisocyanate such as hexamethylene diisocyanate (HMDI), toluylene diisocyanate (TDI), xylelene diisocyanate, diphenylmethane diisocyanate and polyphenylmethane polyisocynate; and terminal isocyanate-containing compounds obtained by reacting an excess amount of these isocyanates and polyols such as ethylene glycol, butanediol, glycerol, trimethylolpropane and castor oil. As the blocking agents, there may be mentioned phenol derivatives such as phenol, cresol, or xylenol; ε-caprolactam; acetoxime; and alcohols such as methanol and ethanol.

As said other resins, amino resins, phenol resins, xylene resins, acrylic resins, silicone resins and generally, commercially available resins in the form of solid may be used. But said amino resin, phenol resin or xylene resin cannot use more than 10% in powder paint, since a coated film using such a resin produces pinholes owing to gas release at the time of baking.

The proportion of pigment amount per total resin amount namely sum up of the amounts of the amino polyester resin, epoxy compound, other resins and other compounds is changed due to a variety of powder paint properties aimed. For example, in the case of clear paint no pigment is used, and in the case of white paint titanium dioxide, used in an amount of about 40 – 80 PHR (parts per hundred resin), and in the case of a black paint carbon black are used in an amount of about 1 – 3 PHR. Generally pigment amount more than 100 PHR is unfavorable as the properties of the powder paint becomes inferior.

As the coloring pigments and extender pigments, conventional heat-resistant pigments may be used. For example, as coloring pigments, titanium dioxide, carbon black, iron oxide, chrome yellow, phthalocyanine blue, phthalocyanine green, etc. and as extender pigments talc, barium sulfate, clay, etc. may be used.

If necessary, additives such as wetting agents, leveling agents, flow control agents, antifoam agents, etc. may be added.

The powder paint of the present invention is prepaed by mixing in usual manners said amino-group-containing polyester resin, with said epoxy compound, and other resins, other compounds, coloring pigments, extender pigments, additives, etc. in the form of powder or small particle, etc. and blending the mixture under melt at an elevated temperature of 80° to 130° C in a blender such as an extruder or a hot roll mill and then after cooling grinding the blended mixture to obtain the powder paint. In another method, the mixture is blended at ambient temperature by using a ball mill, a ribbon blender, or the like.

Thus obtained powder paint is coated on an object in various conventional methods and then the coated film is baked at a temperature of about 180° C to about 220° C for 10 to 30 minutes, and consequently a tough film is gained.

The following examples are intended to illustrate but are not intended to limit the scope of the invention.

EXAMPLE 1

In a four-necked flask, 325 g of dimethyl terephthalate, 175 g of neopentyl glycol and 2.5 g of lithium naphthenate were charged. The whole was heated to 200° – 280° C under blowing an inert gas therein and resulting methanol was distilled out from the reaction system to accelerated the reaction. The reaction was terminated when softening point of the resin became higher than 90° C. Upon cooling to 180° C, 8 g of tetraethylene pentamine were added and the whole was reacted for 30 minutes at 180°C. Thus resulting resin was light yellow, transparent solid at ambient temperature (softening point: 95° C). Said amino-group-containing polyester resin was ground and 70 parts of said resin, 30 parts of Epon 1004 (an epoxy resin of Shell Chemical Corp.) and 50 parts of titanium dioxide are mixed together in Henschel mixer in powder form and blended using an extruder and ground into powder and sieved through 150 mesh screen to obtain a powder paint. In a gel time test carried out at 180°C, the paint was geled after 5 minutes. The obtained paint was applied to an iron panel treated with zinc phosphate by electrostatic spraying to obtain film thickness of 50 – 70μ. Test results of the coating film were excellent as shown in Table 1.

EXAMPLE 2

95 Parts of amino polyester resin obtained in the same manner as in Example 1, 5 parts of triglycidyl isocyanurate and 50 parts of titanium dioxide were mixed together in powder form, and the mixture was blended in a hot roll mill and ground into powder and sieved through a 150 mesh screen to obtain a powder paint. The paint had excellent properties as shown in Table 1.

EXAMPLE 3

80 Parts of the amino-group-containing polyester resin obtained in the same manner as in Example 1, 20 parts of Adeka resin EP 4085 (trade name of a hydrogenated bisphenol type epoxy resin of Asahi Denka Kogyo Co.; epoxy equivalent = 540 – 610), 50 parts of titanium dioxide and 0.5 parts of Modaflow as a flow control agent were mixed together and the mixture was blended in an extruder and ground into powder and sieved through a 150 mesh screen to obtain a powder paint. The paint had excellent properties as shown in Table 1.

EXAMPLE 4

10 Grams of melamine were added in place of tetraethylene pentamine to the polyester resin obtained in the same manner as in Example 1 and the whole was reacted at 220° C for 30 minutes to obtain a transparent solid resin. The product was used as a powder paint and its film properties were examined in the same manner as in Example 1 to prove that the properties were nearly the same as that of Example 1 as shown in Table 1. In a gel time test, the product was geled at 180° C after 8 minutes.

EXAMPLE 5

In a four-necked flask, 306 g of isophthalic acid, 271 g of phthalic anhydride, 118 g of trimethylolethane, 305 g of neopentyl glycol and 20 g of xylol were charged. The whole was reacted at 230° C for about 2 hours, while nitrogen gas was introduced therein. The reaction was terminated when softening point and acid value of 85° C and 20, respectively, were attained. Xylol was distilled out by blowing strong nitrogen gas stream. Upon cooling to 180° C, 15 g of triethylenetetramine were added and the whole was reacted at 180°C for 30 minutes to obtain light yellow, transparent, solid resin having softening point of about 75°C. The resin was treated in the same manner as in Example 1 to obtain a powder paint. Test results of the coating film carried out in the same manner as in Example 1, are shown in Table 1.

REFERENCE EXAMPLE 1

A resin was prepared in the same manner as in Example 5 except that 171 g of phthalic anhydride and 100 g of adipic acid were used in place of 271 g of phthalic anhydride. The resulting resin had a softening point of about 50° C. Grinding of the resin was difficult due to blocking.

EXAMPLE 6

20 Grams of dicyandiamide were added in place of triethylenetetramine to the polyester resin obtained in the same manner as in Example 5 and the whole was reacted at 220° C for 30 minutes to obtain a transparent, solid resin. The resin was mixed together with Epon 1004 and titanium dioxide in the same manner as in Example 1, and the mixture was blended at ambient temperature and then ground into powder to obtain a powder paint. Film properties of the paint are shown in Table 1. Though appearance and gloss were inferior but other properties of the film were excellent.

EXAMPLE 7

200 Grams of trimethylolpropane and 2 g of lithium naphthenate were added to 700 g of Viron 200 (a trade name of a linear polyester resin of polyethylene isophthalate of Toyobo Co.) and the whole was heated to 240° – 280° C for 60 minutes. Then, 100 g of phthalic anhydride were added thereto to carry out esterification while an inert gas was blown therein. The reaction was terminated when acid value and softening point of 25° and 80° C, respectively, were attained. Upon cooling to 180° C, 15 g of xylylenediamine were added to the mixture and the whole was heated at 180° C for 30 minutes. 60 Parts of the resin was mixed together with 40 parts of Epon 1004 and 50 parts of titanium dioxide in the same manner as in Example 1 to obtain a powder resin. Test results of the coating film of the paint were excellent as shown in Table 1.

What we claim is:

1. A powder paint comprising:
    a. an aminopolyester resin having a softening point of from about 50° C to about 200° C and being the elevated temperature reaction product of:
        i. a polyester resin comprising a reaction product of at least one dihydric, trihydric or tetrahydric alcohol and at least one acid, greater than 50 mol % of said acid component consisting of at least one member selected from the group consisting of terephthalic acid, isophthalic acid and the lower alkyl esters thereof; and
        ii. from 0.2 to 15% by weight of said polyester, of an amino compound; and
    b. a polyepoxide compound, wherein the weight ratio of the aminopolyester resin to the polyepoxide is from about 99:1 to about 1:1.

2. A powder paint according to claim 1 wherein the elevated reaction product of the polyester resin and amino compound is one obtained by heating said polyester resin and said amino compound at a temperature of about 130° to about 250° C for from about 10 to about 60 minutes.

3. A powder paint according to claim 1 wherein said alcohol is dihydric and selected from the group consisting of ethyleneglycol, propyleneglycol, butyleneglycol, neopentylglycol, diethyleneglycol, dipropyleneglycol, pentanediol, hexanediol, heptanediol and [4,4'-isopropyliene dicyclohexanol (hydrogenated bisphenol A)] 2,2-bis-(4-hydroxy cyclohexyl) propane.

4. A powder paint according to claim 1 wherein said alcohol is trihydric and selected from the group consisting of glycerol, trimethylolethane, trimethylolpropane and tris-2-hydroxyethylisocyanurate.

5. A powder paint according to claim 1 wherein said alcohol is pentaerithritol.

6. A powder paint according to claim 1 wherein said amine is selected from the group consisting of ethylenediamine, diethylenetriamine, triethylenetetramine, tetraethylenepentamine, phenylenediamine, xylenediamine, diaminodiphenylmethane and diaminodiphenylsulfone.

Table 1

| Test items | Testing method | Example 1 | Example 2 | Example 3 |
|---|---|---|---|---|
| Baking condition | Hot air drying furnace | 200° C-20 min. | 200° C-20 min. | 200° C-20 min. |
| Hardness | Pencil hardness | 2 H | H | H |
| Gloss | Gloss meter 60°-60° | 90 | 90 | 88 |
| Cross cut test | 10 mm × 10 mm lattice (100 × 1 mm squares), pulling off with cellophane adhesive tape | 100/100 | 100/100 | 100/100 |
| Impact test | Du Pont's impact tester ½"φ | 300g/30cm | 300g/30cm | 300g/30cm |
| Salt spray test | JIS-K-5400 | 400 hrs unchanged | 400 hrs unchanged | 400 hrs unchanged |
| Accelerated weathering test | Atlas weather-O-meter | 400 hrs unchanged | 400 hrs unchanged | 400 hrs unchanged |
| Alkali resistance | Immersion in 3% NaOH | 240 hrs unchanged | 240 hrs unchanged | 240 hrs unchanged |

| Test items | Example 4 | Example 5 | Example 6 | Example 7 |
|---|---|---|---|---|
| Baking condition | 220° C-20 min. | 200° C-20 min. | 200° C-20 min. | 200° C-20 min. |
| Hardness | H | H | H | H |
| Gloss | 91 | 90 | 60 | 90 |
| Cross cut test | 100/100 | 100/100 | 100/100 | 100/100 |
| Impact test | 300g/50cm | 300g/30cm | 300g/30cm | 300g/30cm |
| Salt spray test | 400 hrs unchanged | 400 hrs unchanged | 400 hrs unchanged | 400 hrs unchanged |
| Accelerated weathering test | 400 hrs unchanged | 400 hrs unchanged | 400 hrs unchanged | 400 hrs unchanged |
| Alkali resistance | 240 hrs unchanged | 240 hrs unchanged | 240 hrs unchanged | 240 hrs unchanged |

7. A powder paint according to claim 1 wherein said amine includes at least one member selected from the group consisting of urea, dicyandiamide, melamine, benzoguanamine, and aceto guanamine.

8. A powder paint according to claim 1 wherein said polyester resin is the transesterification product of polyethylene telephthalate or polyethylene isophthalate and an alcohol selected from the group consisting of ethyleneglycol, propyleneglycol, butyleneglycol, neopenthylglycol, diethyleneglycol, dipropyleneglycol, pentanediol, hexanediol, heptanediol, 2,2-bis(4-hydroxycyclohexyl)-propane, glycerol, trimethylolethane, trimethylolpropane, tris-2-hydroxyethylisocyanurate, and pentaerithritol.

9. A powder paint according to claim 1 including as a further component at least one solid resin selected from the group consisting of blocked polyisocyanate compounds, amino resins, phenol resins, xylene resins, acrylic resins, and silicone resins.

10. A powder paint according to claim 1 including as a further component at least one additive selected from the group consisting of wetting agents, leveling agents, flow control agents and anti-foam agents.

11. A powder paint according to claim 1 wherein a pigment is present in an amount of no more than 100 parts per hundred by weight of amino polyester.

12. A powder paint according to claim 1, wherein said acid component also contains at least one member selected from the group consisting of phthalic anhydride, lower alkyl esters of phthalic acid, tetrahydrophthalic anhydride, hexahydrophthalic anhydride, hymic anhydride, methylhymic anhydride; aliphatic dicarboxylic acids; Diels-Alder adducts; fatty acids; fatty acid dimers; benzoic acid, p-tert-butylbenzoic acid, dimethylolpropionic acid, tris-2-carboxyethyl isocyanurate, abietic acid and hydrogenated rosin.

'13. A powder paint according to claim 12 wherein the acid component of said polyester includes at least one acid selected from the group consisting of coconut oil fatty acid, soybean oil fatty acid, safflower oil fatty acid and drying oil fatty acid.

14. A powder paint according to claim 1 wherein said polyepoxide compound is selected from the group consisting of epoxides of 2,2-bis-(4-hydroxyphenyl)-propane, epoxides of 2,2-bis-(4-hydroxycyclohexyl)-propane, epoxides of 1,1,2,2-tetrakis-(4-hydroxyphenyl)-ethane and diglycidyl esters.

15. A powder paint according to claim 14 wherein said polyepoxide compound is the condensate of 2,2-bis-(4-hydroxycyclohexyl)-propane and epichlorohydrin.

16. A powder paint according to claim 14 wherein said polyepoxide is a diglycidylester based epoxy resin derived from phthalic anhydride and epichlorohydrin.

17. A powder paint according to claim 14 wherein said polyepoxide is triglycidylisocyanurate.

18. A powder paint according to claim 14 wherein said polyepoxide compound is the condensate of 2,2-bis-(4-hydroxyphenyl)-propane and epichlorohydrin.

19. A powder paint according to claim 14 wherein said polyepoxide compound is the condensate of 2,2-bis-(4-hydroxyphenyl)-propane and β-methylepichlorohydrin.

20. A powder paint according to claim 14 wherein said polyepoxide compound is the condensate of 1,1,2,2,-tetrakis-(4-hydroxyphenyl)-ethane and epichlorohydrin.

21. Process for the production of a powder paint which comprises:
1. mixing:
   a. an aminopolyester resin having a softening point of from about 50° C to about 200° C and being the elevated temperature reaction product of:
      i. a polyester ester resin comprising a reaction product of at least one dihydric, trihydric or tetrahydric alcohol and at least one acid, greater than 50 mol % of said acid component consisting of at least one member selected from the group consisting of terephthalic acid, isophthalic acid and the lower alkyl esters thereof; and
      ii. from 0.2 to 15%, by weight of said polyester, of an amino compound; and
   b. a polyepoxide compound, in the weight ratio of the aminopolyester resin to the polyepoxide is from about 99:1 to about 1:1;
2. blending the mixture; and
3. comminuting the solid blended mixture.

22. The process according to claim 21 wherein said aminopolyester resin and said polyepoxide are mixed with at least one member selected from the group consisting of blocked polyisocyanate compounds, amino resins, silicone resins, wetting agents, leveling agents, flow control agents and anti-foam agents.

23. The process according to claim 21 wherein said mixture is blended at melt at a temperature of 80° C to 130° C.

24. The process according to claim 21 wherein said mixture is mechanically blended at ambient temperatures.

* * * * *